Figure 1:
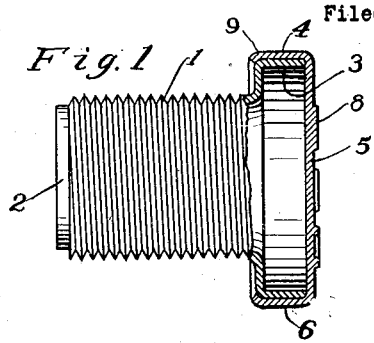

Oct. 4, 1927.

J. H. HORSBURGH

IDENTIFICATION MECHANISM

Filed Dec. 22, 1922

1,644,132

INVENTOR.
John H. Horsburgh
BY Gray and Lilly
ATTORNEYS.

Patented Oct. 4, 1927.

1,644,132

UNITED STATES PATENT OFFICE.

JOHN H. HORSBURGH, OF CLEVELAND, OHIO.

IDENTIFICATION MECHANISM.

Application filed December 22, 1922. Serial No. 608,498.

This invention relates to identification mechanism, such as caps or plates bearing suitable insignia, for valve plugs for various liquid flow mechanism, as for faucets or water spigots. My improvement is particularly applicable to the ends of valve parts which are provided with means for rotation thereof in advancing or releasing such parts to open or close a valve.

It is an object of my improved construction to provide an insignia plate that is detachable from the valve part with which it is adaptable, so that various plates of identical construction, except as to the particular inscription they bear, shall be interchangeable for the purpose of removing plates bearing one inscription, and substituting therefor others having a different one.

It is another object to provide plates or identification caps or covers which may be utilized as a means for actuating the valve part in opening or closing the valve as well as in bearing the information which will be an advantage to the reader who may act upon it and operate the said valve part.

It is a still further object of my improvement to provide caps or plates for valve parts that are durable and practically indestructible, the material for this purpose being metal, or rather rigid, synthetic plates, such as fiber or other compressed material, or even molded material, all being adaptable for receiving the impression desired on their face.

Other advantages and objects of my invention will appear as the description proceeds.

In the drawings which illustrate various embodiments of my invention,—

Figure 6:
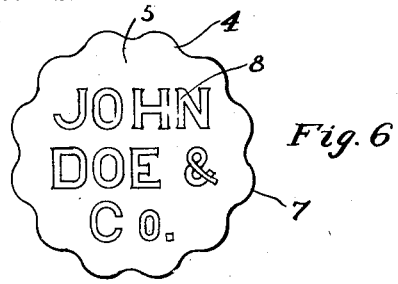
Figure 2:
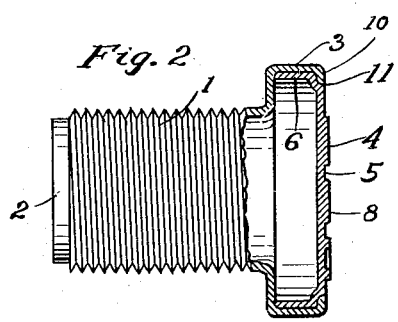
Figure 3:
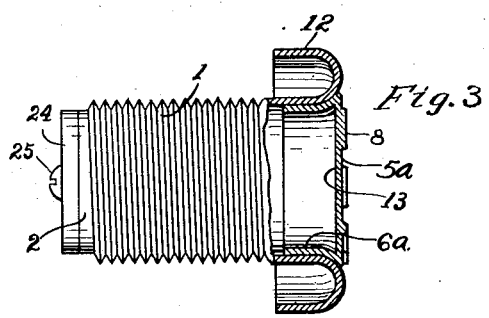
Figure 4:
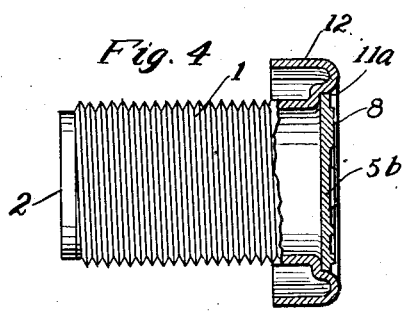
Figure 5:
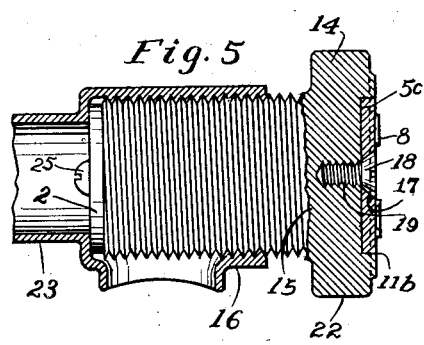
Figure 7:
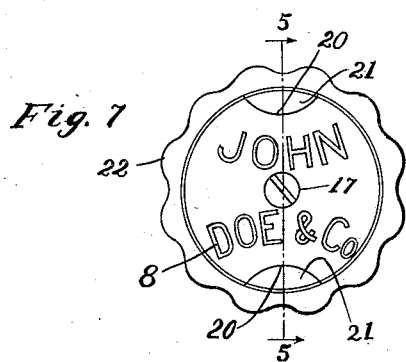

Figure 1 is a side elevation of a valve plug bearing a plate embodying my improvement, and with parts of the front portion thereof broken away to show a longitudinal section therethrough, Figures 2 to 4 show similar views of modified forms of my improvements, Figure 5 is a longitudinal section of a valve portion of a faucet with a plug applied thereto, the head thereof being shown in section on the line 5—5 of Fig. 7, and a modified form of plate detachably applied thereto, Figure 6 is a face view of a plate of the form shown in section in Fig. 1, and Figure 7 is a face view of the form of plate seen in section in Fig. 5.

Like characters of reference refer to similar parts throughout the several views of the drawings, in which 1 designates hollow valve plugs, as shown in Figs. 1 to 4, the same being illustrated in these views as formed of sheet metal, having a closed end 2 adapted to fit against the valve seat for which it is intended. In Figs. 1 and 2, the periphery of the open end is expanded to form an enlarged portion 3, which engages the insignia bearing cap or plate which is the particular subject of the present invention. The said outer flared part 3 is corrugated peripherally to make a positive fitting between the cap and the part 3, as will be more fully explained later.

The cap or plate is designated generally by the numeral 4 and is composed of the circular, flat face 5 having an inwardly bent periphery or flange 6, shown in Fig. 1 as enclosing the flared part 3 of the plug, and enclosed by such part in the form shown in Fig. 2. In either case, this bent part or lip 6 is corrugated, as shown at 7, to register neatly with the part 3, so that rotation of the plate accurately moves the valve plug as well. This face plate 5 is provided with the desired inscription 8, as illustrated by the "John Doe" lettering in the drawings.

In the form shown in Fig. 1, the edges of the periphery 6 are bent slightly, as at 9, to attach the caps to the flange 3; while in Fig. 2 the edges 10 of the plug flange 3 are bent about the periphery 6, the latter being provided in this construction with a shallow socket 11 to receive the edges 10.

In Figs. 3 and 4, the periphery of the plug is provided with an over-hanging lip 12 which may be corrugated as are the forms in Figs. 1 and 2. In Fig. 3, a form of plate or cap 13 is provided with the flat face 5$^a$ as in the other forms, but with an attaching flange part 6$^a$ which is reduced as illustrated to enter the interior or inner cavity of the plug. The latter construction provides for possible springing of the reduced flange into position within the plug by making it of slightly greater size than the plug opening, whereby to secure the cap in position.

In Fig. 4, the cap 5$^b$ has no flange but its edges are seated directly in an annular socket 11$^a$ of the lip 12, while Fig. 5 shows a flat cap or plate 5$^c$ as inserted in a central socket 11$^b$ of a head 14 of a solid plug 15 which is here shown assembled with attaching parts of a faucet 16. In this form of cap, a central opening 17 is provided for receiving an attaching screw 18 for fixing in the threaded opening 19 in the head 14. Further means for preventing independent rotation of the cap relative to the head is provided in this form by cutting out peripheral notches 20 from the edges of the cap into which integral projections 21 on the head are adapted to register when the cap is attached in position. The peripheral edges 22 of the head 14 are corrugated in this form as in the others.

Evidently many changes may be made in the disclosed construction without avoiding the spirit of my invention or the limitations of the appended claims, and I do not desire to limit myself other than as expressly stated in these claims and falling within the general scope of my invention. For example, I have shown the cap or plate attached to valve plugs adapted to be threaded externally within the other valve member. Evidently other means may be used for such attachment and actuation; and while the valve seat is shown in Fig. 5 as flared outwardly from the main tube 23, the seat may be formed by crimping the same inwardly without varying the mounting of the cap in any particular. Also the plug element may be provided with washers such as are designated by 24 in Fig. 3, suitable securing means being provided, as a screw 25.

It is further to be noted that I do not limit my construction to a cap or plate having a continuous peripheral flange in the forms shown in Figs. 1 to 3, inclusive. Obviously, in these forms the flange parts may well be merely a portion of the periphery and in some cases a small fractional portion of said periphery, as a prong or prongs, will be adequate to properly position the cap on the plug and hold it from rotation thereon.

What I claim and desire to secure by Letters Patent is,—

1. The combination with a hollow plug having a closed end and an open end having an outwardly flared and corrugated lip forming a peripheral flange for actuation thereof, of an identification cap bearing suitable insignia on its face and having a peripheral flange forming a tubular extension adapted to register telescopically with said plug flange, and cover said open end of the plug.

2. The combination with a hollow valve plug having a closed end and an open end having an enlarged corrugated peripheral flange for actuation thereof, of an identification cap bearing suitable insignia on its face and having a corrugated peripheral flange engaging telescopically said plug flange, the corrugations of the respective parts interlocking to prevent independent rotation of the cap.

3. The combination with a hollow valve plug having a closed end and an open end having an enlarged corrugated peripheral flange for actuation thereof, of an identification cap bearing suitable insignia on its outer face and having a corrugated peripheral flange engaging telescopically the exterior of said plug flange, the corrugations of the respective parts interlocking to prevent independent rotation of the cap.

In testimony whereof I hereunto affix my signature.

JOHN H. HORSBURGH.